United States Patent
Ribarich et al.

(10) Patent No.: US 6,316,887 B1
(45) Date of Patent: Nov. 13, 2001

(54) MULTIPLE IGNITION HIGH INTENSITY DISCHARGE BALLAST CONTROL CIRCUIT

(75) Inventors: Thomas J. Ribarich, Laguna Beach; Robert Marenche, Torrance, both of CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 09/670,279

(22) Filed: Sep. 27, 2000

Related U.S. Application Data
(60) Provisional application No. 60/157,007, filed on Oct. 1, 1999.

(51) Int. Cl.[7] ............................................. G05F 1/00
(52) U.S. Cl. ..................... 315/307; 315/308; 315/360; 315/362; 315/DIG. 7
(58) Field of Search ..................... 315/307, 308, 315/291, 209 R, 224, 244, 227 R, 226, DIG. 7, 360, 362

(56) References Cited

U.S. PATENT DOCUMENTS

| | | | |
|---|---|---|---|
| 5,545,955 | * 8/1996 | Wood | 315/224 |
| 5,563,477 | * 10/1996 | Ribarich et al. | 315/307 |
| 6,111,365 | * 8/2000 | Mirskiy et al. | 315/247 |
| 6,150,773 | * 11/2000 | Ribarich | 315/291 |
| 6,188,183 | * 2/2001 | Greenwood et al. | 315/307 |
| 6,211,623 | * 4/2001 | Wilhelm et al. | 315/224 |

* cited by examiner

*Primary Examiner*—Haissa Philogene
(74) *Attorney, Agent, or Firm*—Ostrolenk, Faber, Gerb & Soffen, LLP

(57) ABSTRACT

A ballast control circuit for a high intensity discharge lamp which operates in conjunction with an existing ballast IC, the IR2157-1, and serves to strike the lamp up to 20 times or until the lamp is lit.

6 Claims, 7 Drawing Sheets

MULTIPLE IGNITION HIGH INTENSITY DISCHARGE BALLAST CONTROL CIRCUIT

This application claims the benefit of U.S. Provisional Application Ser. No. 60/157,007, filed Oct. 1, 1999.

BACKGROUND OF THE INVENTION

1. Field of the Invention

The present invention relates to a circuit for controlling an electronic ballast IC to drive a high intensity discharge lamp.

2. Description of the Related Art

The IR2157-1 IC is a ballast IC manufactured by International Rectifier Corporation of El Segundo, Calif., and is described and claimed in U.S. application Ser. No. 09/225,635, filed Jan. 5, 1999, now U.S. Pat. No. 6,211,623 the disclosure of which is herein incorporated by reference. The IR2157-1 IC operates in accordance with a state diagram to switch between various phases including strike, pre-heat, run, overtemperature, etc. External circuitry and selected components are used to set the operating frequency of the lamp and other parameters.

It would be desirable to provide additional external circuitry, which operates in conjunction with the above-mentioned external circuitry, for striking the lamp up to 20 times or until the lamp is lit.

SUMMARY OF THE INVENTION

The present invention achieves the foregoing objective by providing a ballast control circuit for a high intensity discharge lamp which operates in conjunction with an existing ballast IC and serves to strike the lamp up to 20 times or until the lamp is lit.

Other features and advantages of the invention will become apparent when the following description read in conjunction with the accompanying drawings.

DETAILED DESCRIPTION OF THE PREFERRED EMBODIMENT

Figure 1:
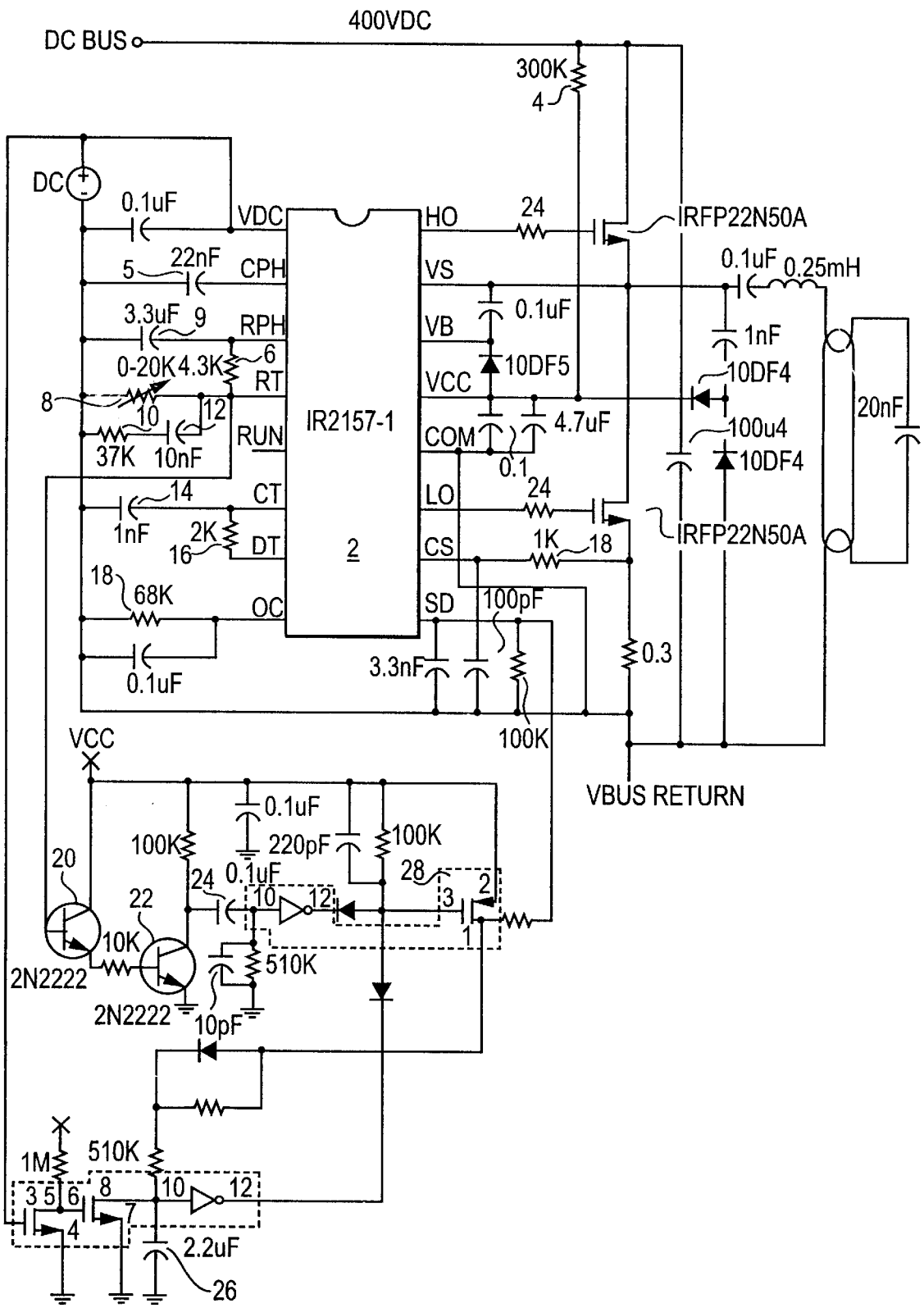
FIG. 1 shows the basic circuit diagram of the external components of the present invention connected to a IR2157-1 ballast IC.

A circuit diagram, showing the external components of the present invention connected to a ballast IC 2, preferably the IR2157-1 IC, is shown in FIG. 1.

The functions of the various components and pin-outs are as follows:

Resistors are connected between VDC, VCC and the rectified AC line, e.g., resistor 4, and are dimensioned so that VCC charges to full value before VDC. In the preferred embodiment of the present invention shown in FIG. 1, resistor 4 has a value of 300 K ohms.

VDC: This pin enables IC 2 to oscillate when it reaches a level of 5 V.

CPH: A capacitor 5 connected between CPH and COM determines the preheat time. Capacitor 4 is preferably 22 nF in the embodiment of FIG. 1. The IC 2 is in preheat mode until the voltage on capacitor 5 reaches 4.0 V. At this level, ignition mode is activated. When CPH=5.1 V, the IC 2 is in run mode.

$$t_{PH} = 4.0E6 \cdot C_{PH}$$

RPH: During preheat, this pin is internally connected (within IC 2) to ground. This causes a resistor 6, preferably 4.3 K ohms, which is connected between RPH and RT, to be connected in parallel with a resistor 8, which is variable resistor of 0–20 K ohms in the preferred embodiment of the invention, to be connected between RT and COM. This results in a higher preheat frequency than a run frequency. A capacitor 9 disposed between RPH and COM, preferably 22 nF, determines the rate at which the frequency changes from preheat to run.

$$F_{PH} = \frac{1}{2\left(\frac{R_T \cdot R_{PH}}{R_T + R_{PH}} \cdot C_T + t_d\right)}$$

RT: A resistor 10 and a capacitor 12 connected in series between RT and COM, and having values in the preferred embodiment of 37 K ohms and 10 nF, respectively, determine the startup frequency. The parallel combination of resistor 10 and resistors 6, 8 determines the preheat frequency.

RUN: This pin is not used. The run frequency is determined by $R_T$, the value of the resistance to COM seen at pin RT.

$$F_{run} = \frac{1}{2(R_T C_T + t_d)}$$

CT: The capacitance at pin CT is set by a capacitor 14. In the preferred emobidment of the invention, capacitor 14 has a value of 1 nF, as calculated in accordance with the following equation:

$$C_T = \frac{1}{R_T}\left(\frac{1}{2f} - t_d\right),$$

where $R_T$ is the resistance to COM as seen by the pin $R_T$ and $t_d$ is the deadtime, as explained below.

DT: Determines the dead time $t_d$, the fall time of the oscillator ramp waveform.

$t_d = 0.69 \cdot R_{DT} \cdot C_T$, where $R_{DT}$ is resistor 16, and $C_T$ is capacitor 14.

$$R_{DT} = \frac{1.44 \cdot t_d}{C_T} = 2K \text{ ohms (for } C_T = 1nF\text{).}$$

OC: Determines the overcurrent threshold, based upon the value of a resistor 18 connected to this pin (preferably 68 K ohms in the preferred embodiment of the invention), which is directly proportional to the current.

SD: Shuts the oscillator down and pulls both gate driver outputs low. This occurs when SD reaches 2 V. Oscillations resume when the level drops below 1.8 V.

CS: This level is determined by the value of resistor 18. When this level is reached, oscillations stop.

LO: Drives low side MOSFET. It also recharges the boot strap capacitor.

VB: High side gate drive floating supply.

VS: High side floating supply return.

HO: High side gate driver output.

The additional circuitry needed for controlling HID lamps in accordance with the present invention is as follows:

Transistors 20 and 22: These transistors shift the voltage level at the RT pin from 2 V to $V_{cc}$.

Capacitor 24: Capacitor 24 provides a short pulse when the voltage at pin RT drops to 0 V.

Capacitor 26: This is the charge capacitor that determines the number of pulses at startup.

The operation of the circuit of the present invention will now be described.

At startup, the voltage level at pin RT rises to 2 V and oscillations begin.

If the lamp does not ignite, the CS pin rises above the OC threshold.

The IC enters fault mode and the oscillations stop. The voltage at pin RT then drops to 0 V and a positive pulse from capacitor 24 is inverted and momentarily turns p-channel MOSFET 28 on. At this time, the voltage level at the SD pin rises above 2 V and capacitor 26 is partially charged. P-channel MOSFET 28 then shuts off and the voltage level at SD drops below 1.8 V. The IC 2 begins to oscillate and the voltage at the RT pin rises to 2 V. This process is repeated about 20 times until the voltage on capacitor 26 reaches a level at which the adjacent inverter changes state and p-channel MOSFET 28 is latched on permanently.

If the lamp remains on before capacitor 26 charges to the point at which the adjacent inverter changes state, p-channel MOSFET 28 remains off, the current sense pin does not rise above the OC threshold, the SD pin remains below 2 V, and the voltage at the RT pin remains at 2 V. The ballast continues to run. It takes about 15 minutes to reach full power. A run frequency of 70 KHz is preferably used to eliminate flickering.

To accommodate for a hot-restrike of the lamp, 30 KV is usually required. A compromise can be made using this circuit such that a temperature sensor is placed on the lamp and the circuit tries to ignite only when the temperature is below a pre-determined threshold. If the temperature is okay and the circuit tries to ignite after 20 tries if the lamp still does not ignite, then it is a lamp fault condition and the circuit latches off. Another approach is to eliminate the temperature sensor and have the circuit try 20 times to ignite the lamp. If the lamp does not strike, the circuit waits a pre-determined period, at the end of which the lamp will be considerably cooler than the running temperature, but not room temperature. Or instead, the circuit can wait only for the linear portion of the thermal time constant to pass. At this time, the circuit will retry to ignite, but at a higher voltage of 4.5 KV. If the lamp still does not strike then, it is a lamp fault condition and the circuit latches off.

Figure 2:
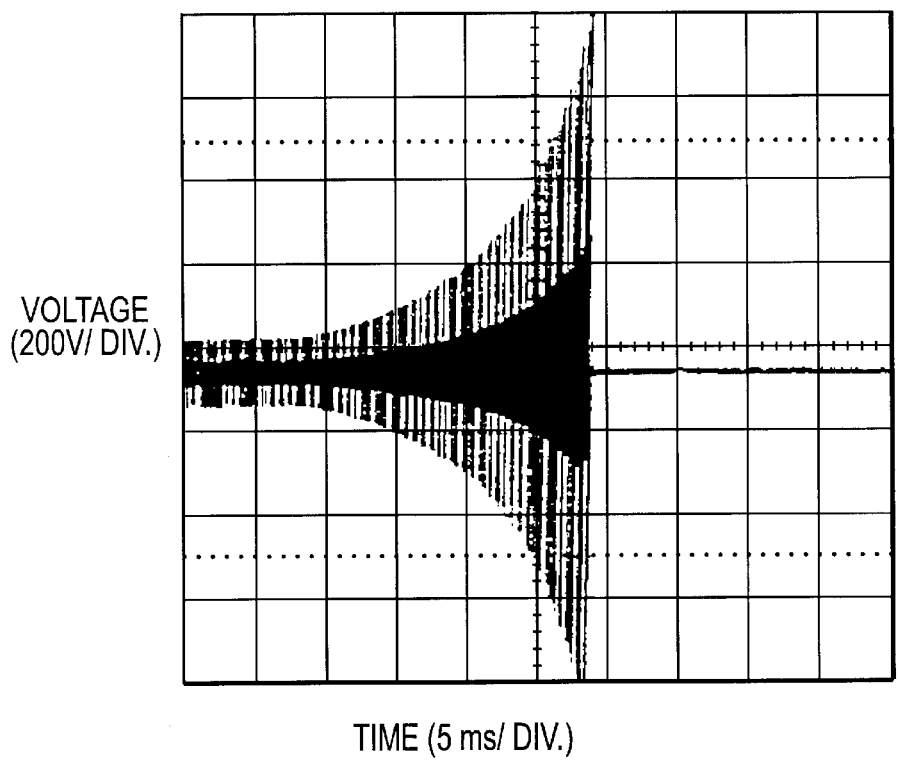
FIG. 2 shows the lamp voltage ramp up to maximum ignition voltage.
Figure 3:
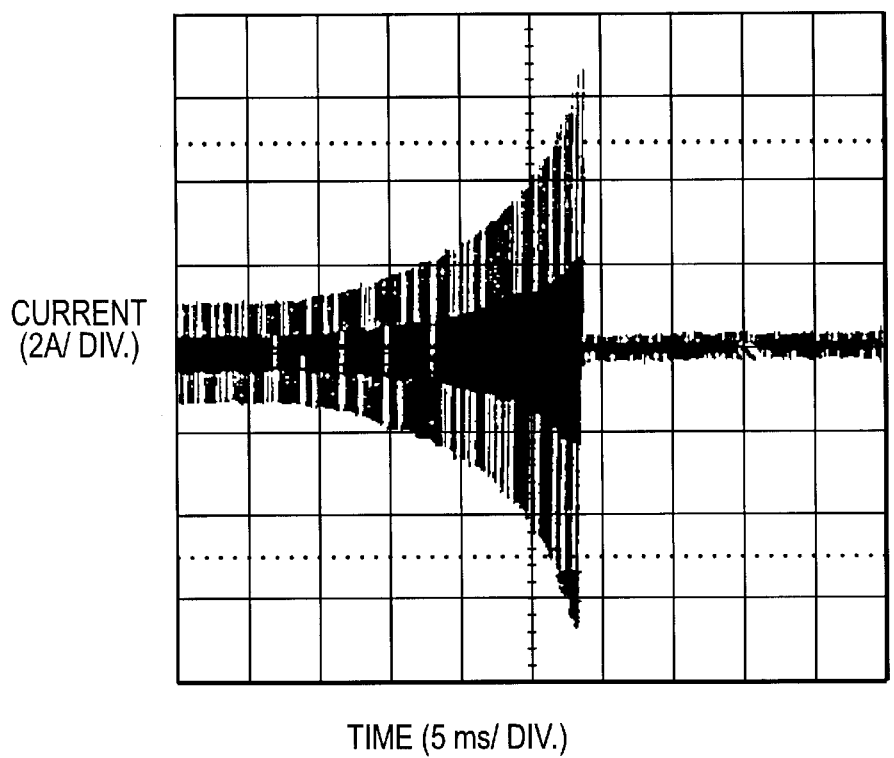
FIG. 3 shows the inductor current ramp up to ignition, lamp removed.
Figure 4:
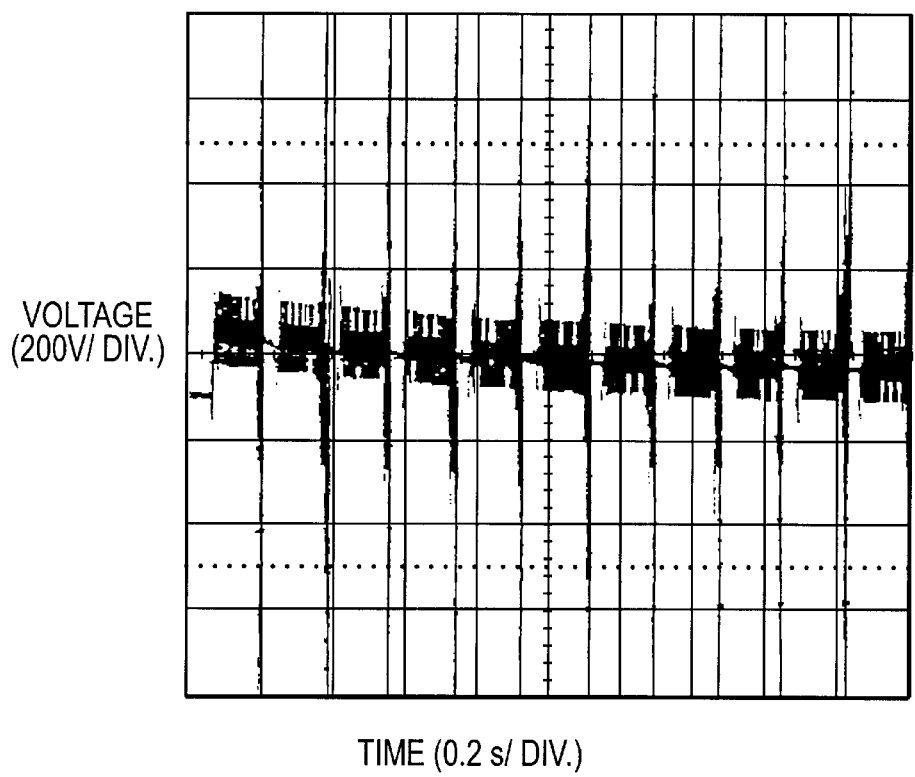
FIG. 4 shows the lamp voltage, repeated striking, lamp removed.
Figure 5:
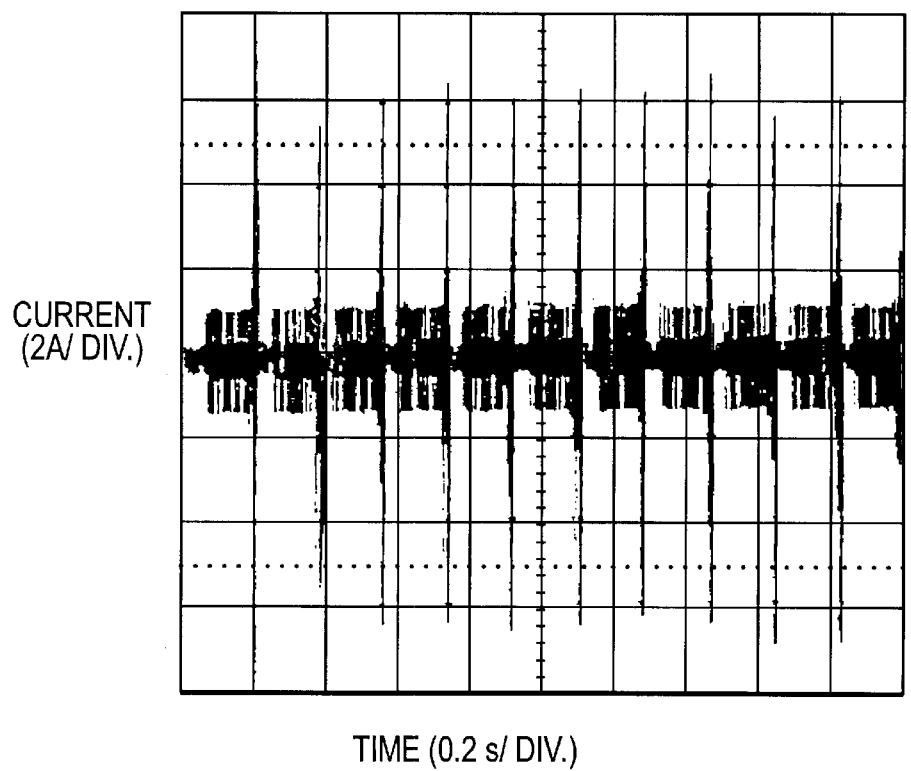
FIG. 5 shows the inductor current, repeated striking, lamp removed.
Figure 6:
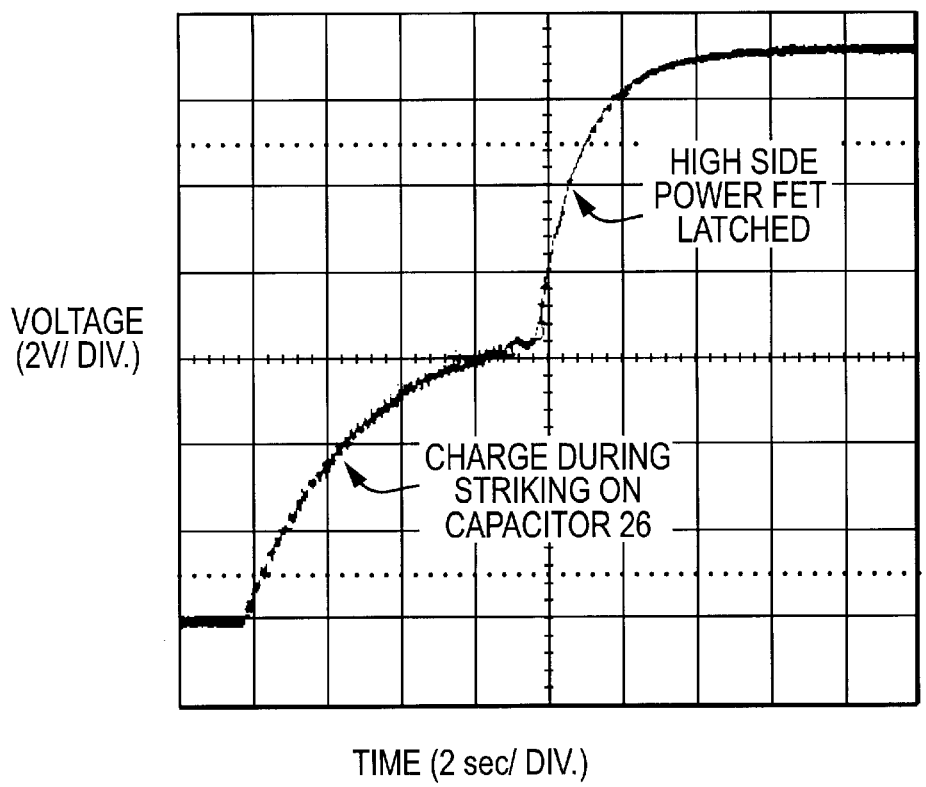
FIG. 6 shows the charging voltage on the capacitor of the present invention which determines the number of strike attempts, lamp removed.
Figure 7:
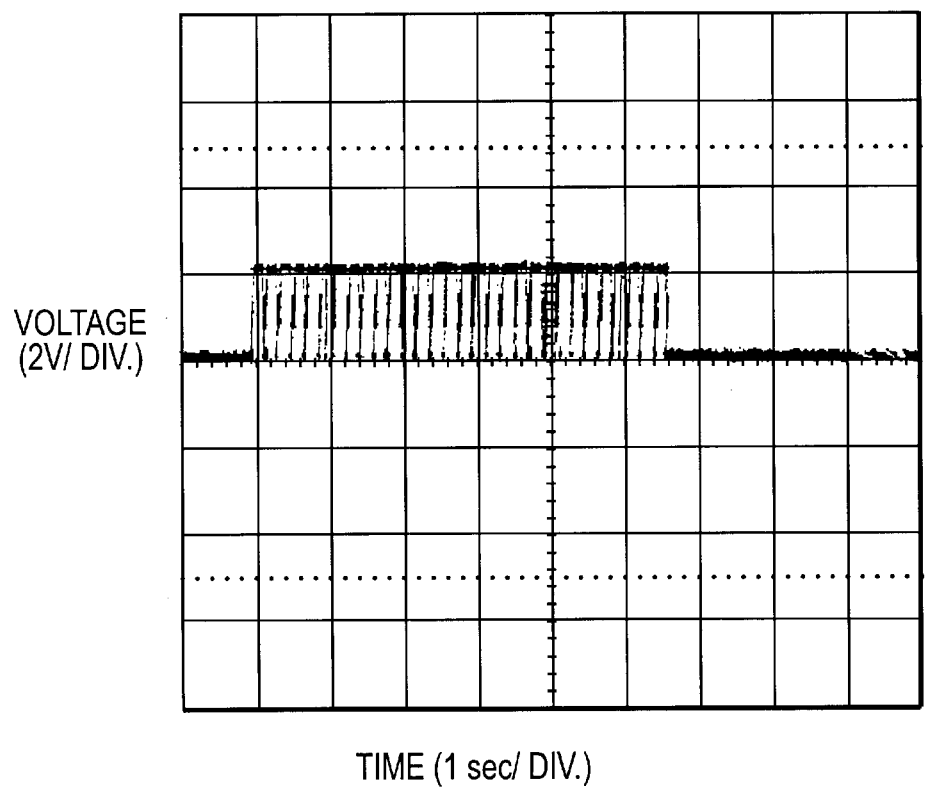
FIG. 7 shows the voltage at the RT pin of the IR2157-1 ballast IC, repeated striking, lamp removed.
Figure 8:
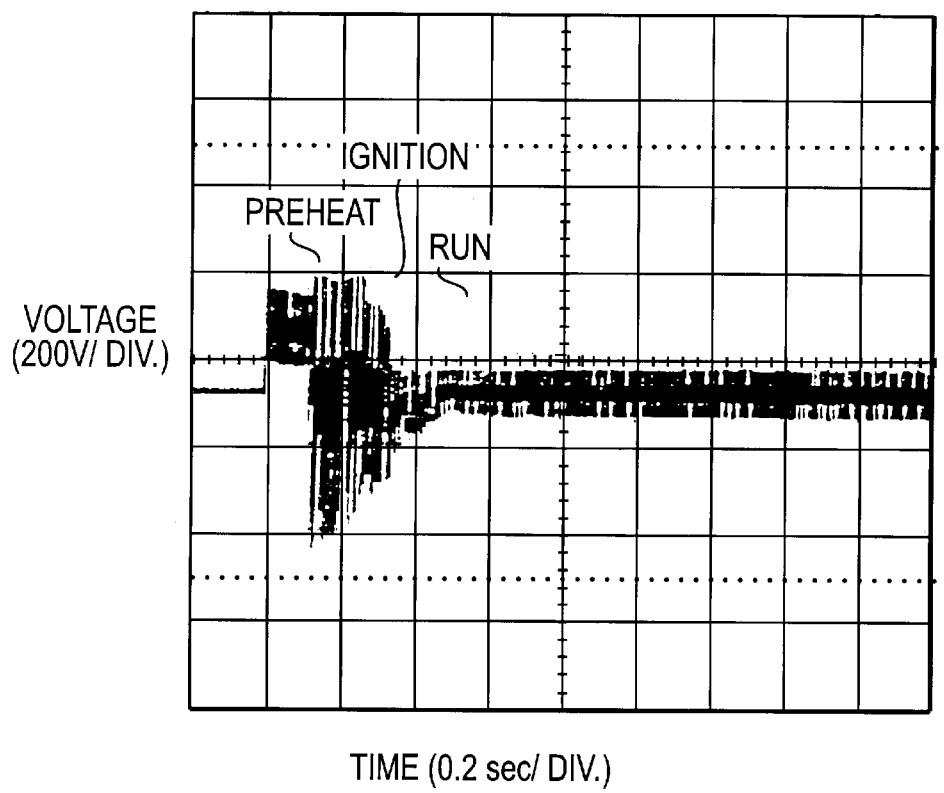
FIG. 8 shows the lamp voltage.
Figure 9:
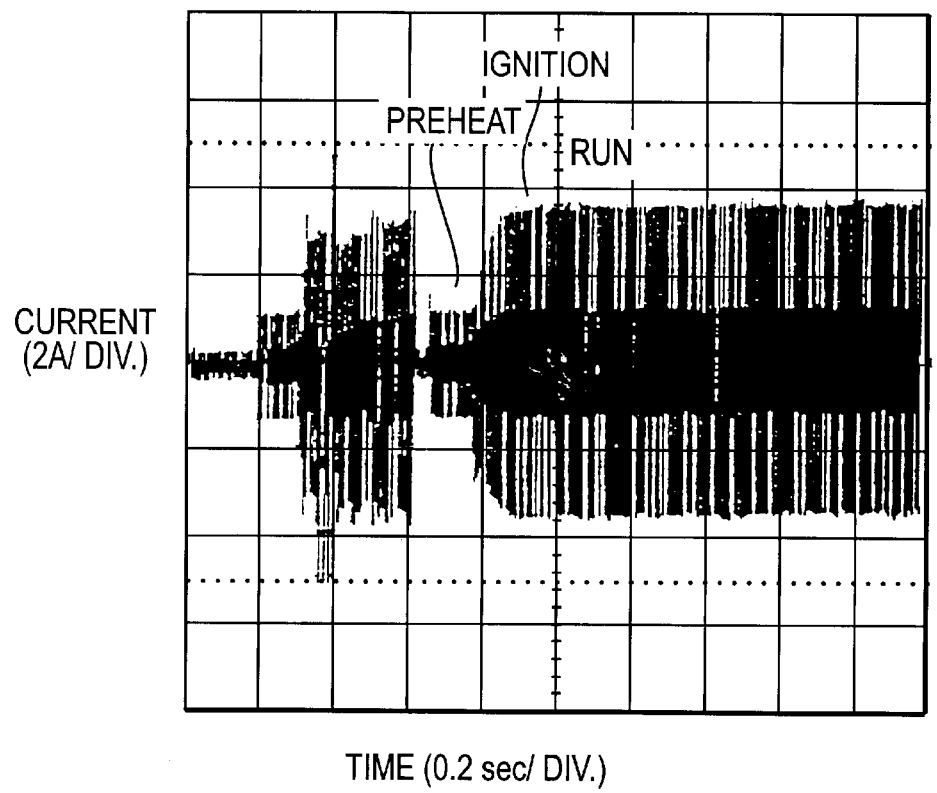
FIG. 9 shows the inductor current in a situation in which the lamp lights after the second strike.
Figure 10:
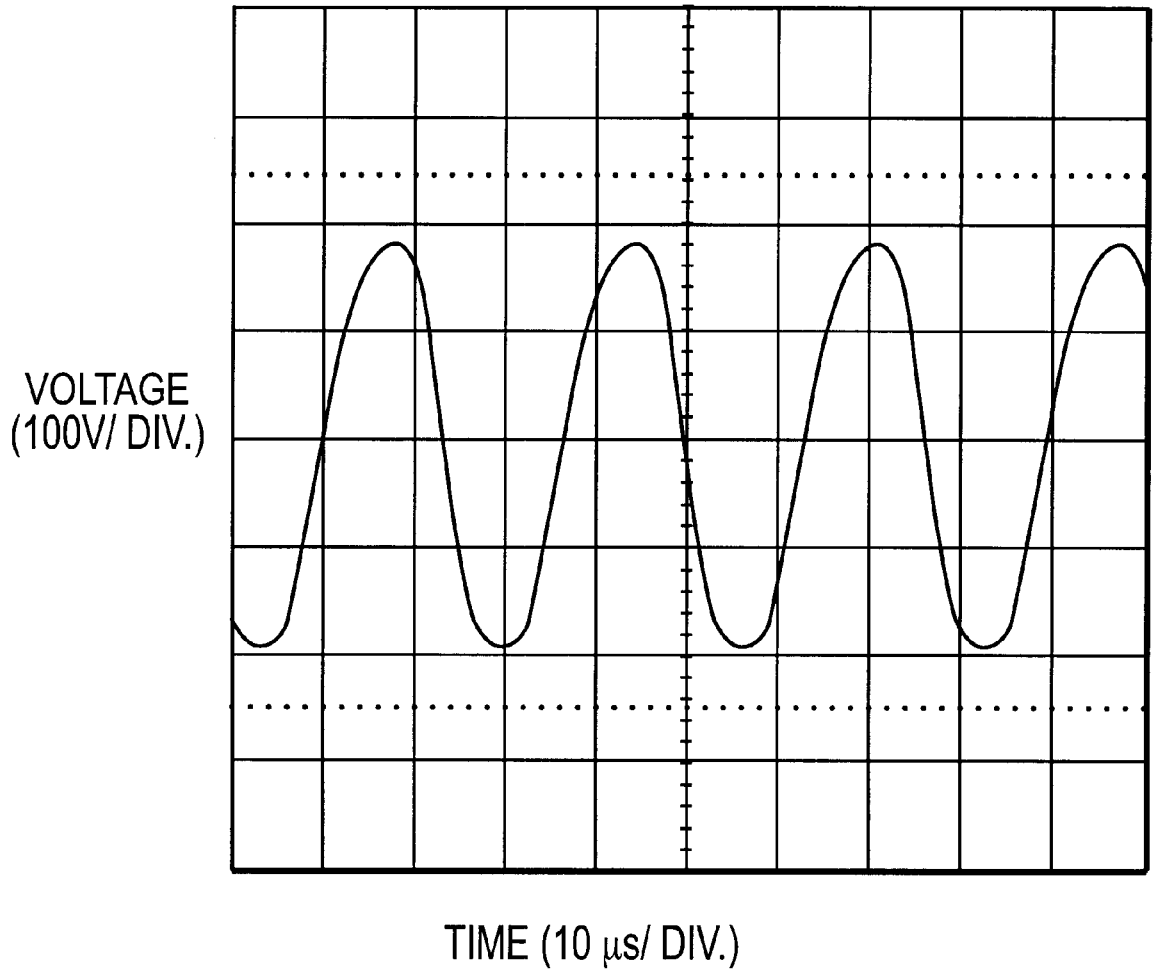
FIG. 10 shows the lamp voltage at full power after 1.5 minutes.
Figure 11:
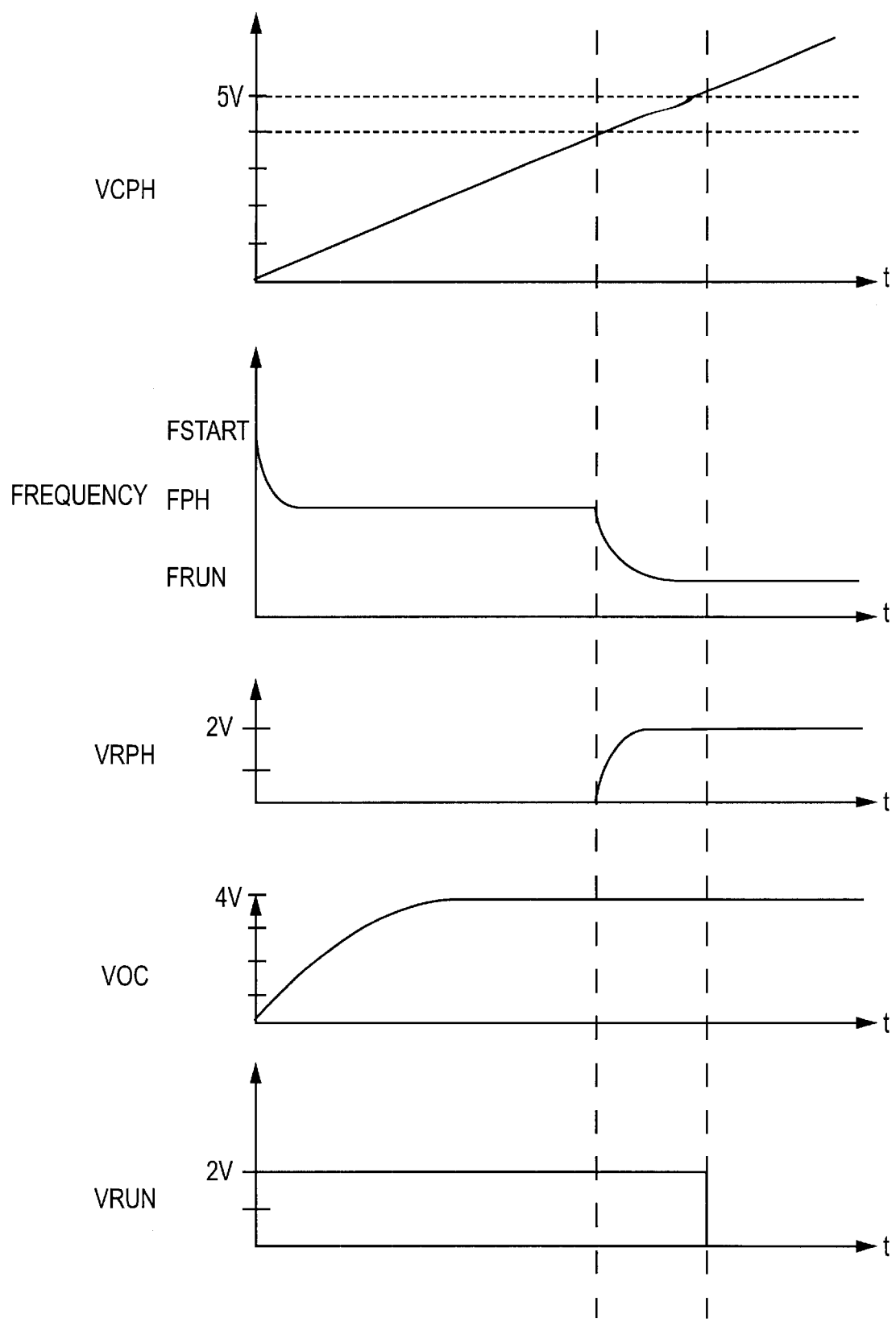
FIG. 11 is a waveform diagram showing the voltage level at the CPH pin, the voltage level at the RPH pin, the ballast operating frequency, the voltage level at the OC pin, and the voltage level at the RUN pin.

FIGS. 2–11, described briefly above, show the waveforms for the various operational modes of the present invention. More particularly, FIG. 2 shows the lamp voltage ramp up to maximum ignition voltage; FIG. 3 shows the inductor current ramp up to ignition, lamp removed; FIG. 4 shows the lamp voltage, repeated striking, lamp removed; FIG. 5 shows the inductor current, repeated striking, lamp removed; FIG. 6 shows the charging voltage on the capacitor of the present invention which determines the number of strike attempts, lamp removed; FIG. 7 shows the voltage at the RT pin of the IR2157-1 ballast IC, repeated striking, lamp removed; FIG. 8 shows the lamp voltage; FIG. 9 shows the inductor current in a situation in which the lamp lights after the second strike; FIG. 10 shows the lamp voltage at full power after 1.5 minutes; and FIG. 11 is a waveform diagram showing the voltage level at the CPH pin, the voltage level at the RPH pin, the frequency at the RPH pin, the voltage level at the OC pin, and the voltage level at the RUN pin.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A ballast control circuit for a high intensity discharge lamp which operates in conjunction with a ballast IC, comprising:

circuitry for repeatedly striking the lamp up to a maximum number of times or until the lamp is lit, whichever comes first; and circuitry for shutting down the ballast IC if the lamp fails to ignite after the maximum number of times of strikes.

2. A ballast control circuit as recited in claim 1, wherein said ballast IC comprises a IR2157-1 ballast IC.

3. A ballast control circuit as recited in claim 1, wherein the maximum number of times is 20.

4. A ballast control circuit as recited in claim 1, wherein said circuitry for repeatedly striking the lamp and said circuitry for shutting the ballast comprises two transistors and two capacitors, the two transistors shifting the voltage level at a RT input of the ballast IC from a voltage level of 2 volts to a voltage level VCC, and a first of the two capacitors provides a short pulse when the voltage level at the RT input drops to 0 volts, and the value of a second of the two capacitors determines the maximum number of times for striking the lamp.

5. A ballast control circuit as recited in claim 1, further comprising a temperature sensor disposed on the lamp, wherein the circuitry for striking the lamp is activated only when the voltage falls below a pre-determined threshold.

6. A ballast control circuit as recited in claim 1, further comprising circuitry for waiting a pre-determined amount of time in the event that the lamp fails to ignite after repeatedly striking the lamp said pre-determined number of times, and then attempting to ignite the lamp again by striking the lamp said pre-determined number of times.

* * * * *